(12) United States Patent
Rubino

(10) Patent No.: US 11,939,165 B2
(45) Date of Patent: Mar. 26, 2024

(54) ACCESSORY ASSEMBLY OF A TOOTHED BELT

(71) Applicant: PR Rubino S.r.l., Anzola Emilia (IT)

(72) Inventor: Attilio Rubino, Anzola Emilia (IT)

(73) Assignee: PR Rubino S.r.l. (IT)

( * ) Notice: Subject to any disclaimer, the term of this patent is extended or adjusted under 35 U.S.C. 154(b) by 0 days.

(21) Appl. No.: 17/857,127

(22) Filed: Jul. 4, 2022

(65) Prior Publication Data

US 2023/0008431 A1   Jan. 12, 2023

(30) Foreign Application Priority Data

Jul. 8, 2021  (IT) ..................... 102021000017987

(51) Int. Cl.
  *B65G 15/44*  (2006.01)
(52) U.S. Cl.
  CPC .... *B65G 15/44* (2013.01); *B65G 2812/02138* (2013.01)
(58) Field of Classification Search
  CPC .......... B65G 15/44; B65G 2812/02138; B65G 17/083; B65G 23/06; B65G 15/42; B65G 15/58
  See application file for complete search history.

(56) References Cited

U.S. PATENT DOCUMENTS

| | | | |
|---|---|---|---|
| 3,005,282 A | 10/1961 | Christiansen | |
| 3,603,450 A | 9/1971 | Chamberlain et al. | |
| 4,832,183 A * | 5/1989 | Lapeyre | B65G 17/08 198/690.2 |
| 5,000,311 A * | 3/1991 | Abbestam | B65G 17/32 198/690.2 |
| 6,321,904 B1 * | 11/2001 | Mitchell | B65G 15/58 198/867.14 |
| 6,695,135 B1 | 2/2004 | Lapeyre | |
| 7,360,640 B2 * | 4/2008 | Cash, III | B65G 15/42 198/851 |
| 8,430,236 B2 * | 4/2013 | Krischer | B65G 17/44 198/853 |

FOREIGN PATENT DOCUMENTS

| | | |
|---|---|---|
| JP | 2013117853 | 6/2013 |
| JP | 2014234283 A | 12/2014 |
| WO | WO 2019096503 A1 | 5/2019 |

OTHER PUBLICATIONS

Flexo World, "Build Idea: Conveyor Belt" 2016, YouTube (https://www.youtube.com/watch?v=G-9xE4PQI40) (Year: 2016).*

* cited by examiner

*Primary Examiner* — Mark A Deuble
(74) *Attorney, Agent, or Firm* — Endurance Law Group PLC

(57) ABSTRACT

An accessory assembly (1) of toothed belts (9), toothed conveyor belts (9a) or portions thereof, comprising a base piece (2), a first piece (3) and a second piece (4) with respectively a first, a second and a fourth coupling part (21, 31, 41). The first and the second coupling part (21, 31) are complementary to one another so that the first piece (3) is couplable above the base piece (2) in one or more predetermined positions and the fourth and the first coupling part (41, 21) are complementary to one another so that the second piece (4) is couplable above the base piece (2) in one or more predetermined positions. The first piece (3) comprises a third coupling part (32) complementary to the fourth coupling part (41) and which faces in an opposite direction to the second coupling part (31).

14 Claims, 11 Drawing Sheets

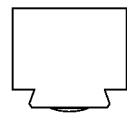 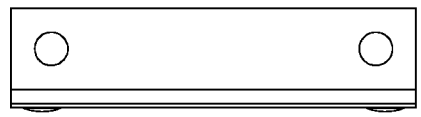
 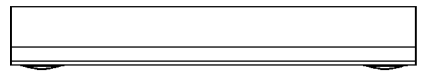
 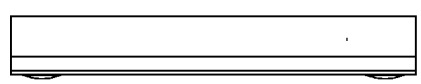
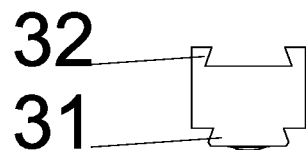 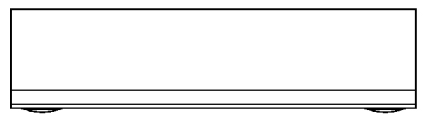
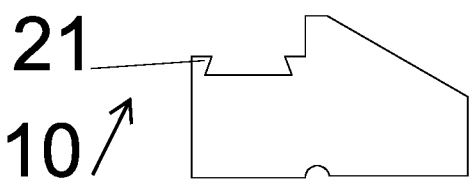 
FIG. 3  FIG. 4
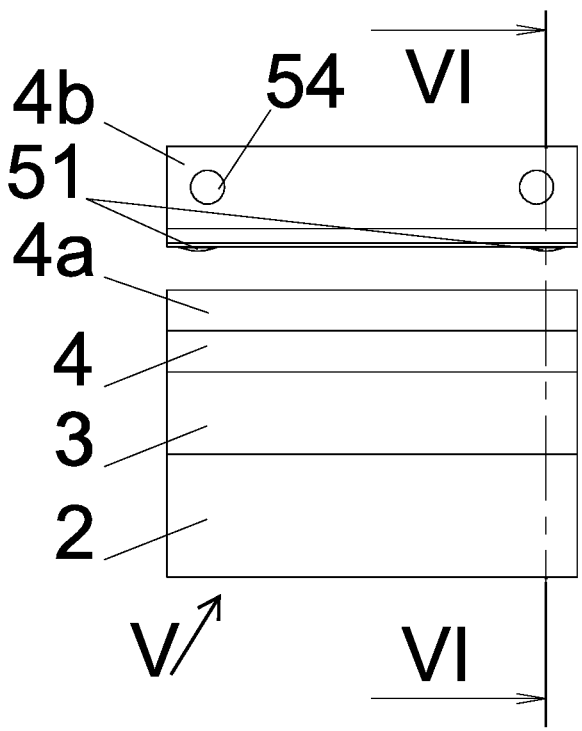 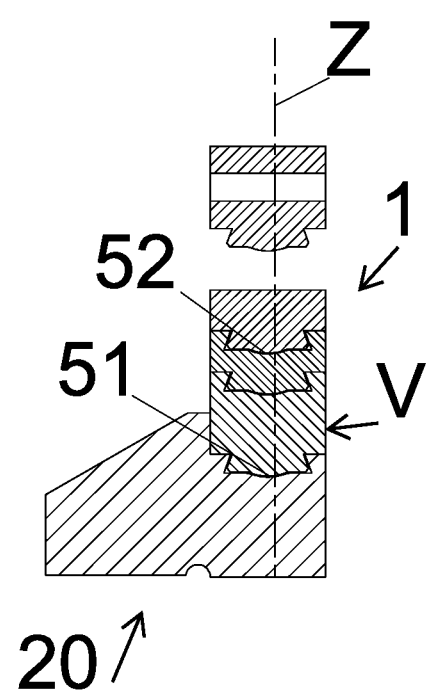
FIG. 5  FIG. 6

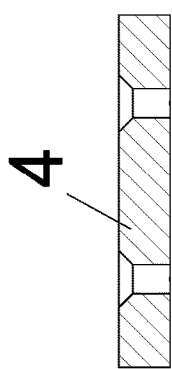
FIG. 16
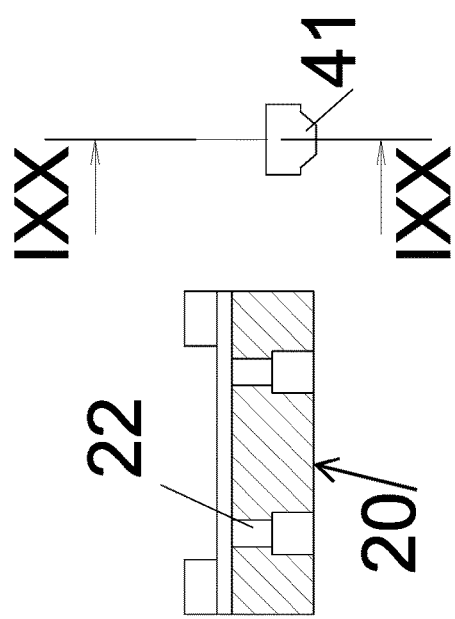
FIG. 17
FIG. 18
FIG. 19
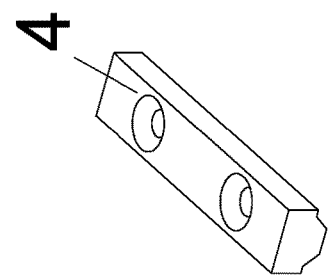
FIG. 23
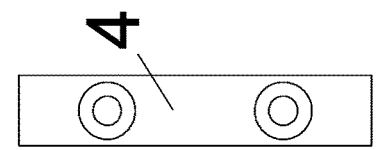
FIG. 22
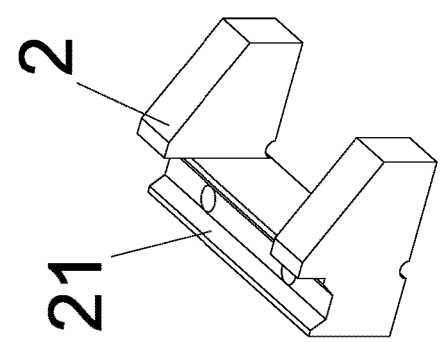
FIG. 21
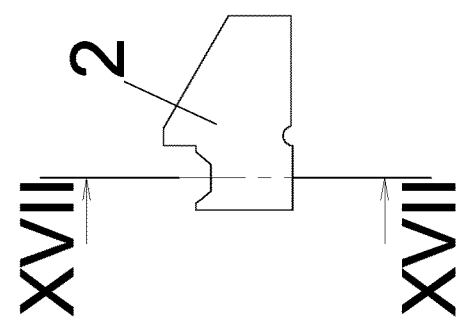
FIG. 20
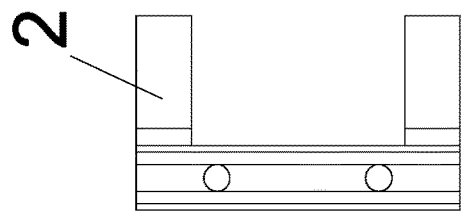

ACCESSORY ASSEMBLY OF A TOOTHED BELT

DESCRIPTION OF THE INVENTION

Prior Art

The present invention relates to the technical sector of toothed belts or toothed conveyor belts or portions thereof, generically referred-to in the following as toothed belts. In particular, the invention relates to accessories of toothed belts, in greater detail to various attachments or cleats, flights or supports which are associated to the base of the toothed belts with different purposes; for example, for supporting an element or for contacting products or objects. The invention is especially utilisable in synchronised product transport systems.

As is known, toothed belts are used in very many fields of application and are characterized by a high level of customisation, which also impacts on accessories. For example, to transport different products a same toothed belt can be used that is equipped with different accessories in terms of shape and/or dimension and/or positioning on the base of the toothed belt.

Numerous variants of accessories, or accessory assemblies, have been developed, of toothed belts to respond to the various applicational needs. Only by way of example, document U.S. Pat. No. 6,321,904B1 describes removable and/or interchangeable supports with respect to base elements, solidly constrained to the base of the toothed belt and appropriately conformed, while WO2019235632A1 describes accessories which are associated to the toothed belt via a through-hole fashioned in the base of the toothed belt.

The prior art solutions do not enable easy customising of the accessories or allow only limited customisations. The height thereof, in a perpendicular direction to the base of the toothed belt, and the width thereof, in a transversal direction to the longitudinal extension direction of the toothed belt, are very often the object of studies and tests for each single machine or type of machine. Further, the shape of the accessory and the exact positioning thereof with respect to the base of the toothed belt, even after numerous work cycles have taken place, often have an important role in the optimisation of the machine using the toothed belt.

SUMMARY OF THE INVENTION

A first aim of the present invention is to obviate the drawbacks of the accessories and the accessory assemblies of the prior art.

A second aim is to provide an accessory assembly of a toothed belt which facilitates customisation.

A further aim of some embodiments is to guarantee the correct positioning of the accessory assembly on the toothed belt.

The aims of some embodiments of the invention are to provide further customisations and/or to facilitate the management of the store and/or the production.

These and other aims, which will be obvious to the expert in the sector from a reading of the following text, are attained by means of an accessory assembly, a kit for forming an accessory assembly, a method for forming an accessory assembly, or a system for moving products, as disclosed herein.

In accordance with the teachings of the present document, the accessory assembly of toothed belts, toothed conveyor belts or portions thereof, comprises a base piece, a first piece and a second piece.

The base piece is configured for contacting the base of a toothed belt, of a toothed conveyor belt or of a portion thereof, comprising a first coupling part.

The first piece comprises a second coupling part.

The first coupling part and the second coupling part are complementary to one another so that the first piece is couplable above the base piece in one or more predetermined positions.

The accessory assembly advantageously comprises a second piece comprising a fourth coupling part.

Further, the fourth coupling part and the first coupling part are complementary to one another so that the second piece is couplable above the base piece in one or more predetermined positions and the first piece comprises a third coupling part complementary to the fourth coupling part and which faces in an opposite direction to the second coupling part so that the second piece is couplable above the first piece in one or more predetermined positions.

BRIEF DESCRIPTION OF DRAWINGS

The further aspects of the invention and specific embodiments of the invention will be described in the following part of the present description, according to what is set down in the claims and with the aid of the accompanying sheets of drawings, in which:

FIGS. 3 and 4 respectively show a lateral view and a frontal view of FIG. 2;

FIG. 5 shows a frontal view of FIG. 1 with the trace of the cutting plane of the next figure;

FIG. 6 is a section view of FIG. 5;

Figure 25:
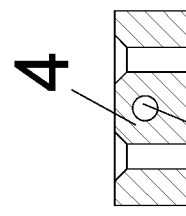
Figure 31:
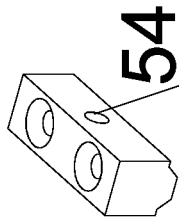
Figure 24:
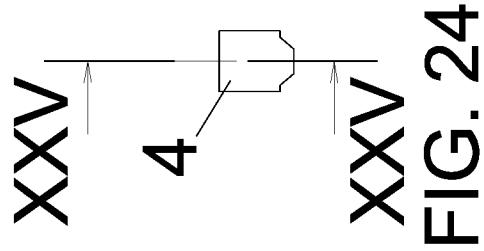
Figure 30:
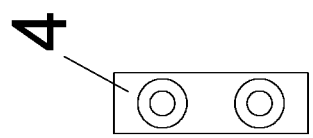
Figure 34:
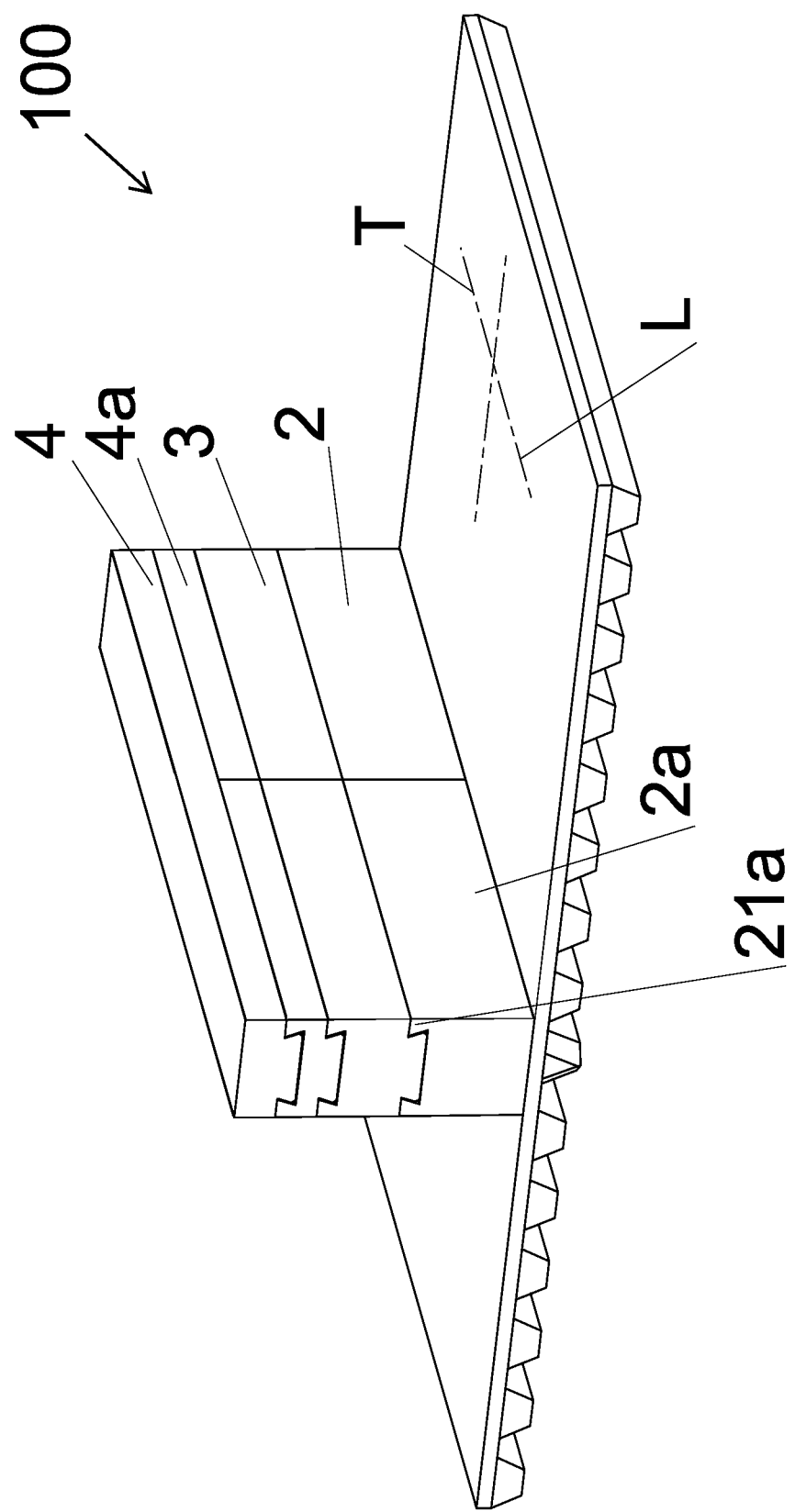

FIGS. from 16 to 33 show some examples of pieces according to the invention, with FIGS. 17, 19 and 25 showing sections of the figures preceding them;

FIG. 34 is yet another embodiment of a system for moving products according to the invention.

DESCRIPTION OF PREFERRED EMBODIMENTS

Figure 12:
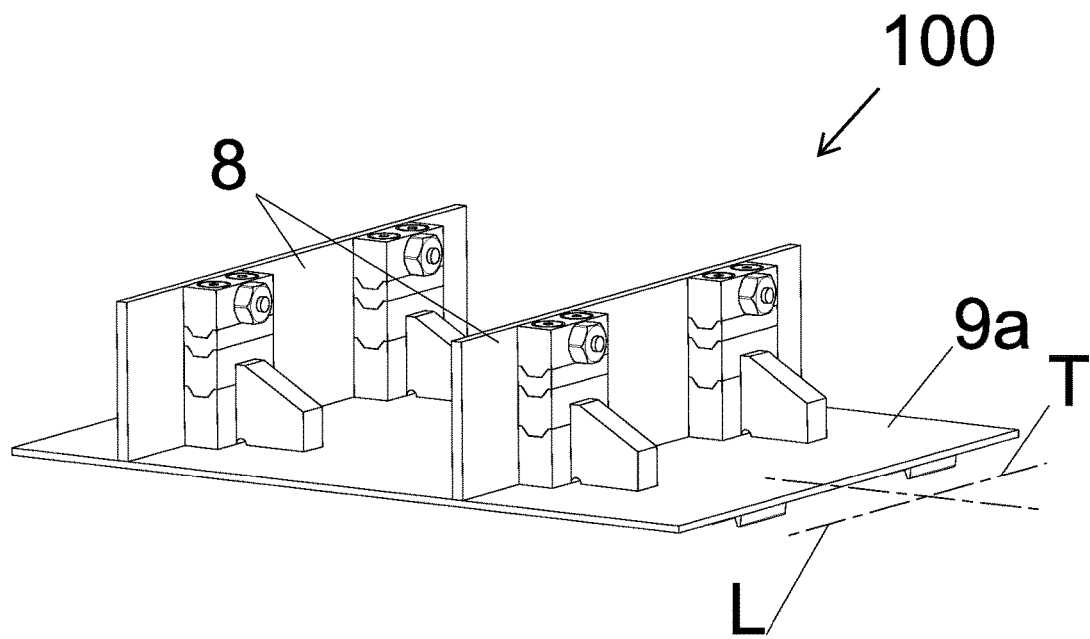
Figure 13:
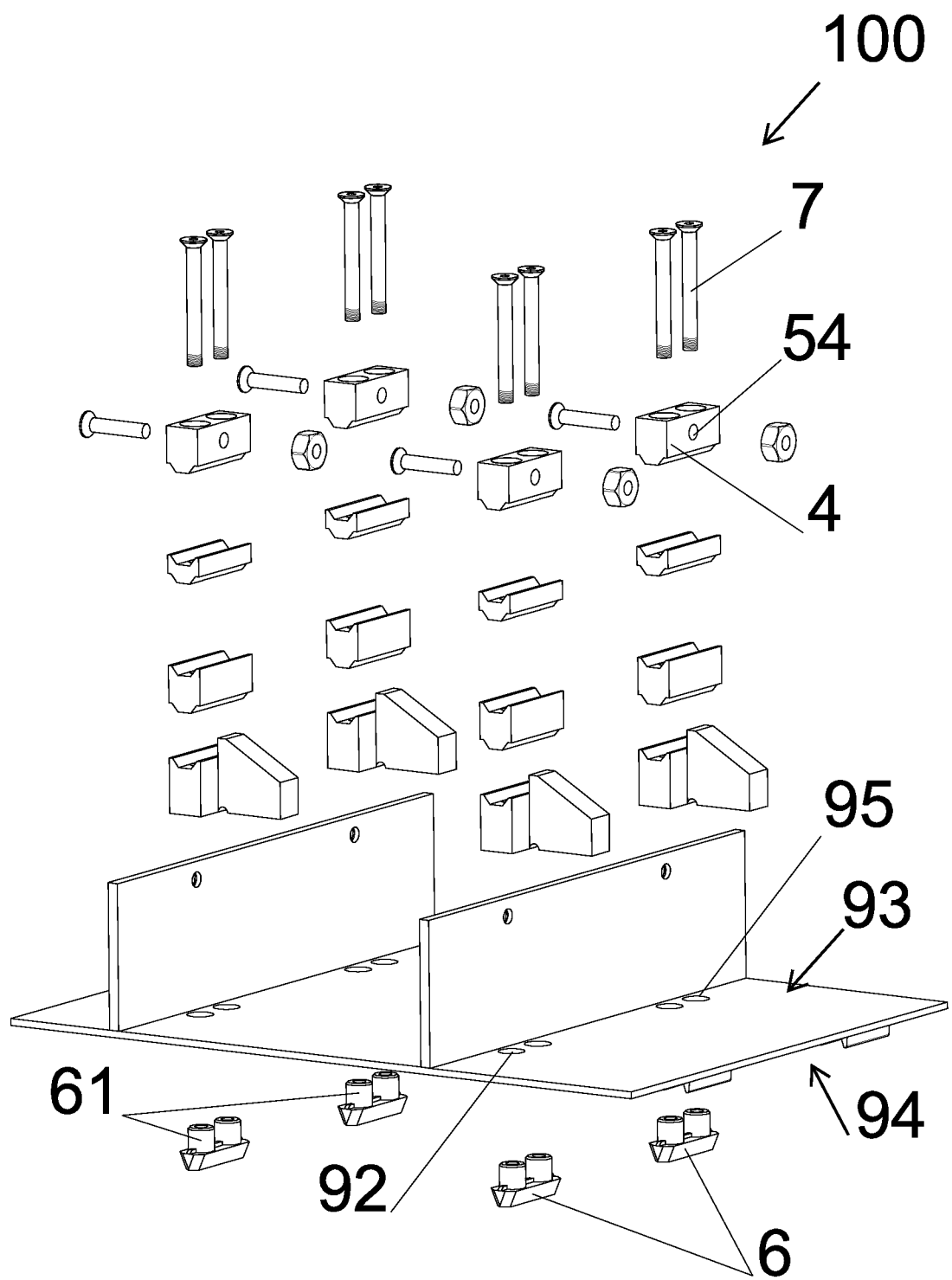
FIG. 13 is an exploded view of FIG. 12.

With reference to the appended sheets of drawings, reference numeral 1 denotes an accessory assembly (1) of toothed belts (9), toothed conveyor belts (9a) or portions thereof comprising a base (91). An example of toothed conveyor belt (9a) is illustrated in FIGS. 12 and 13, while the other figures illustrate toothed belts (9). In fact in the illustrations of the appended drawings the toothed belts (9) and the toothed conveyor belt (9a) are partially represented and are therefore illustrated as portions. These are utilized, for example, for moving or positioning products in restricted spaces. As already expressed in the foregoing, the teachings of the present description apply regardless of the flexible element utilized and the term "toothed belts" (9) is therefore intended to be a general reference.

An embodiment of the accessory assembly (1) comprises a base piece (2), a first piece (3) and, advantageously, a second piece (4).

The base piece (2) is configured for contacting the base (91) of a toothed belt (9), of a toothed conveyor belt (9a) or of a portion thereof and it comprises a first coupling part (21).

The first piece (3) comprises a second coupling part (31) and a third coupling part (32).

The first coupling part (21) and the second coupling part (31) are complementary to one another so that the first piece (3) is couplable above the base piece (2) in one or more predetermined positions.

The second piece (4) comprises a fourth coupling part (41).

The fourth coupling part (41) and the first coupling part (21) are advantageously complementary to one another so that the second piece (4) is couplable above the base piece (2) in one or more predetermined positions. Further, the first piece (3) comprises a third coupling part (32) complementary to the fourth coupling part (41) and which faces in an opposite direction to the second coupling part (31) and the second piece (4) is couplable above the first piece (3) in one or more predetermined positions.

The accessory assembly (1) of the invention enables a high degree of customisation as the first piece (3) and the second piece (4) might be used in an interchangeable way and/or at least one of the two might be replicated in height, i.e. in a direction moving away from the base piece (2). With the availability of a plurality of pieces identical to the base piece (2), the first piece (3) and the second piece (4) a multiple of combinations are obtained which enable easy variation of the overall height of the accessory assembly (1) and/or the width and/or the functionality thereof, such as for example if one of the pieces comprises holes (54) for the attachment of other elements.

In the present description, by "vertical direction" is meant the coupling direction of the pieces which leads to an increase in the height of the accessory assembly while the longitudinal direction (L) and the transversal direction (T) refer to the toothed belt (9), as typically occurs in the reference sector. The pieces and the accessory assembly (1) have a width of the dimension that is predisposed to extend in the transversal direction (T), a height in the dimension that is predisposed to extend perpendicularly to the base (91) of the toothed belt (9) and a thickness in the dimension that is predisposed to extend in the longitudinal direction (L).

The possibilities increase in the case of the accessory assembly (1) comprising further second pieces (4a, 4b) which are differentiated by shape, height or width. For example, in FIG. 2 the first piece (3) might be replaced by the second piece (4), enabling in any case the connection of a further piece. In the same way, in FIG. 2 the further second pieces (4a, 4b) illustrated might replace the second piece (4). This leads to the ability to set up the accessory assembly (1) in a modular way. The foregoing greatly facilitates the management of the store, the installation and the realisation of special treatments which will no longer have to be made in small batches.

A no less important aspect is the possibility of modifying the accessory assembly (1) over time, for example after functioning tests or following modifications to the machine. The optimisation of the accessory assembly (1) and/or the reutilisability of the pieces is thus facilitated, with obvious benefits in terms of environmental impact.

For example, with a few pieces having a height of 5 millimetres it would be possible to realize many heights for the accessory assembly (1); the accessory assembly rarely exceeds 60 millimetres in height. A machine designed for moving a box having a height of 30 millimetres can be rapidly adapted to a new box having a height of 35 or 40 millimetres.

Again by way of example, should the pieces be made of an aluminium alloy, it would be more economical and simpler to manufacture them and treat them all with a silver-ion antibacterial agent, in comparison with the case of accessories produced time by time for each single application. Treatments of this sort have an important part to play when accessory assemblies are used, with distinct bodies rather than in single pieces, as in the interstices between the various pieces can become home to dirt.

The coupling parts (21, 31, 32, 41) enable the alignment of the pieces which are added in height, i.e. in a vertical direction (Z), while keeping the accessory assembly (1) stable and sturdy, as can be deduced from observing the jointing of the embodiments in the appended sheets of drawings.

The technical expert knows numerous shapes of the coupling parts (21, 31, 32, 41) which enable reciprocally positioning two pieces; many of these shapes are included as examples in the prior art. FIGS., 1, 11 and 15 illustrate some preferred embodiments by way of example, though not limiting and/or exhaustive. In other words the coupling parts (21, 31, 32, 41) define reliefs and cavities which, following the coupling, bring the walls of distinct pieces to cooperate to oppose, or prevent, a displacement or a reciprocal rotation.

Figure 1:
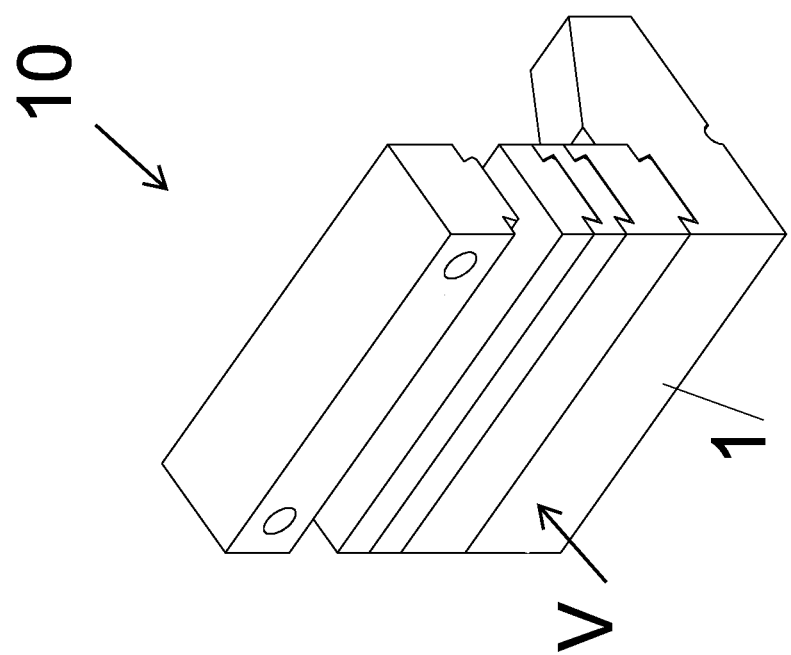
FIG. 1 is an axonometric view of an embodiment of a kit according to the invention from which an embodiment of the accessory assembly of the invention has been obtained.
Figure 7:
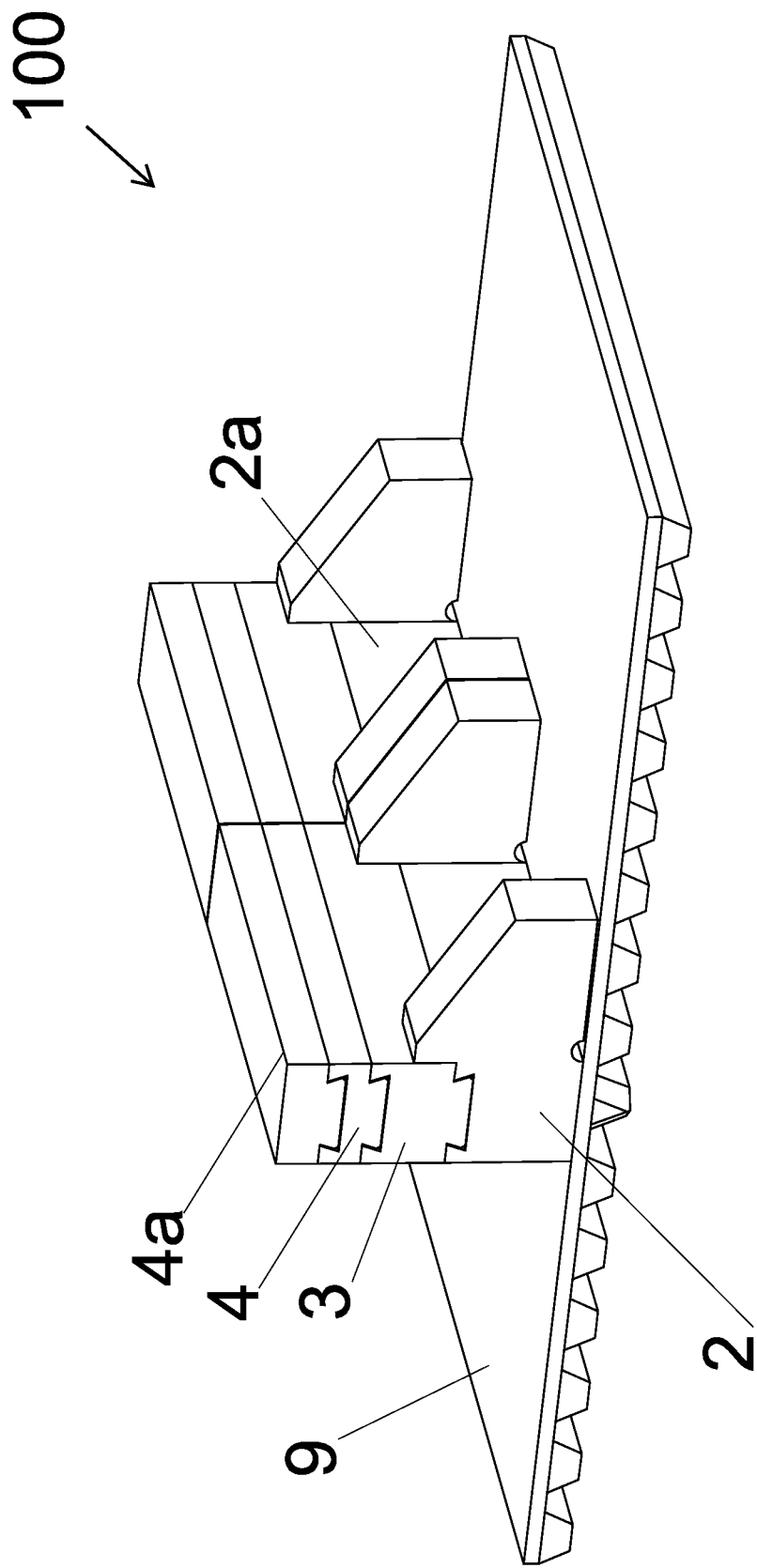
FIG. 7 is an embodiment of a system for moving products according to the invention.
Figure 11:
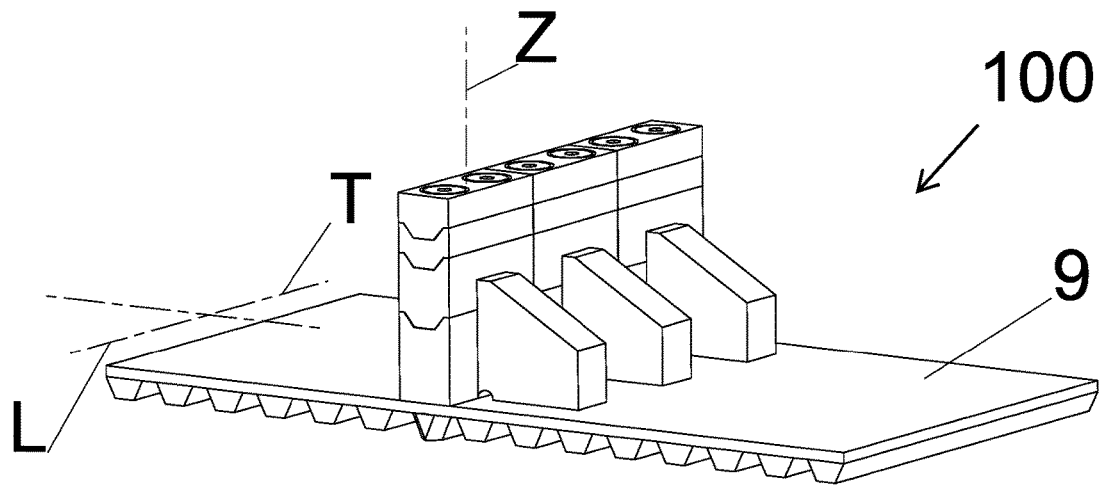
FIGS. 11 and 12 are further embodiments of a system for moving products according to the invention.
Figure 15:
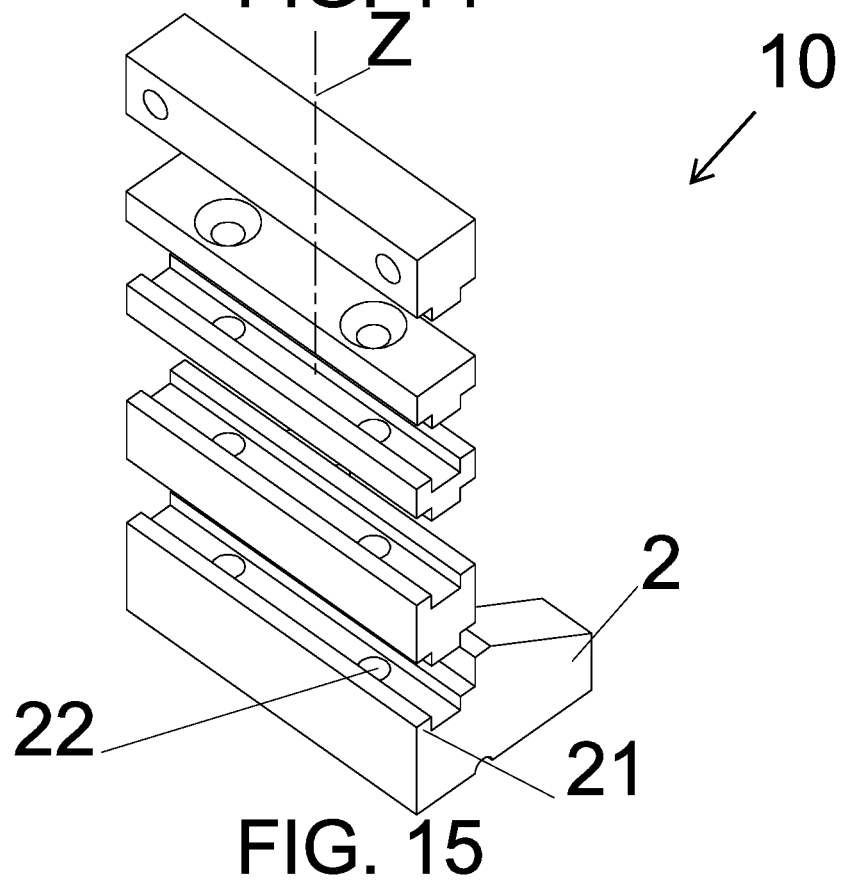
FIG. 15 is an axonometric view of a further embodiment of a kit according to the invention.
Figure 26:
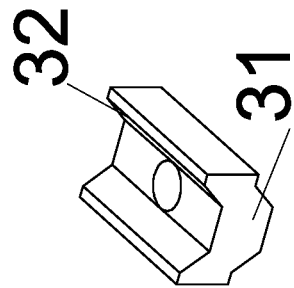
Figure 27:
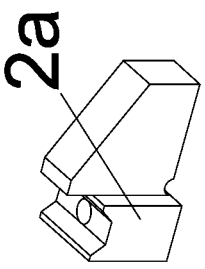
Figure 29:
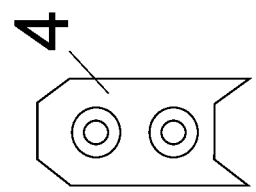
Figure 32:
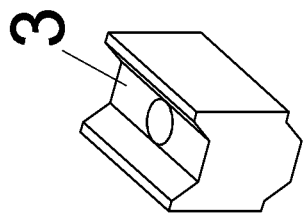
Figure 28:
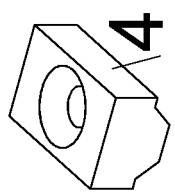

The shapes of the coupling parts (21, 31, 32, 41) of FIGS. 11 and 15 enable defining the reciprocal position between the pieces with respect to the direction of the thickness thereof, corresponding to the longitudinal direction (L) in the figures of the drawings, but do not prevent the raising and/or displacement thereof in a lateral direction, corresponding to the transversal direction (T) in the figures. The shape of the coupling parts (21, 31, 32, 41) of FIG. 1, sometimes referred-to as "dovetail", allows a more precise positioning between the pieces and prevents raising thereof.

With reference to FIG. 3, two opposite walls of the female coupling parts (21, 32) can be observed, which extend upwards to define a hollow zone and which have an internal face that is inclined so that the hollow zone tapers towards the free ends of the walls. The walls preferably extend over the whole width of the pieces. In a like but opposite way, the male coupling parts (31, 41) extend downwards to form a protuberance which has inclined external faces so that the protuberance broadens towards the free end. The shape of the protuberance and the hollow zone are preferably substantially alike, except for small precise modifications, in order to account for the possible local interferences which might be due to production tolerances, as can be observed in FIG. 6.

In FIG. 11 the internal faces of the walls and the external faces of the protuberance which extend upwards or downwards in the vertical direction (Z) of coupling, are inclined so that the protuberance narrows and the hollow zone broadens.

In FIG. 15 the protuberance and the hollow zone are constant along the vertical direction (Z) as the internal faces and external faces are not inclined.

The dimensional and shape tolerances obtainable in the realisation of the various pieces often motivate the choice of one coupling or another; the coupling of FIG. 3 leads to further advantages as it constrains the pieces to one another in the vertical direction (Z).

The third coupling part (32) is preferably conformed alike to the first coupling part (21), and more preferably the fourth coupling part (41) is conformed alike to the second coupling part (31).

Notwithstanding the fact that is possible to customize the couplings between the pieces, for example by making it possible for a coupling part to be coupled with two coupling parts having different shapes, the management of the accessory assembly (1) is facilitated when the coupling parts (21, 31, 32, 41) have the same shape.

The base piece (2), the first piece (3) and the second piece (4) are preferably conformed in such a way as to define a flat vertical wall (V) with the first coupling part (21), the second coupling part (31), the third coupling part (32) and the fourth coupling part (41) being coupled.

The flat vertical wall (V) can be observed, for example, in FIG. 5: the frontal face of the accessory assembly (1) defines a wall that extends in the vertical direction (Z) of composition of the pieces, i.e. in the direction of the height of the accessory assembly (1). Once the accessory assembly (1) is associated to the toothed belt (9), the flat vertical wall (V) is substantially perpendicular to the base (91).

The base piece (2) preferably comprises a flat face perpendicular to the base face (20) and the first piece (3) and the second piece (4) have a respective flat face and are conformed so that, when coupled, the flat face of the base piece (2) and the flat faces of the first piece (3) and the second piece (4) are continuous.

The flat vertical wall (V) guarantees an identical behaviour of the accessory assembly (1) in height and/or enables correct positioning of objects borne on the toothed belt (9). This is particularly useful within a system (100) for moving products in which the flat vertical wall (V) will preferably be arranged on the frontal part of the accessory assembly (1) with respect to the advancement direction.

At least two parts, couplable to one another, between the first coupling part (21), the second coupling part (31), the third coupling part (32) and the fourth coupling part (41), are preferably configured so as to pose resistance to a relative vertical movement between the base piece (2) and the first piece (3) or between the first piece (3) and the second piece (4), when coupled.

Figure 8:
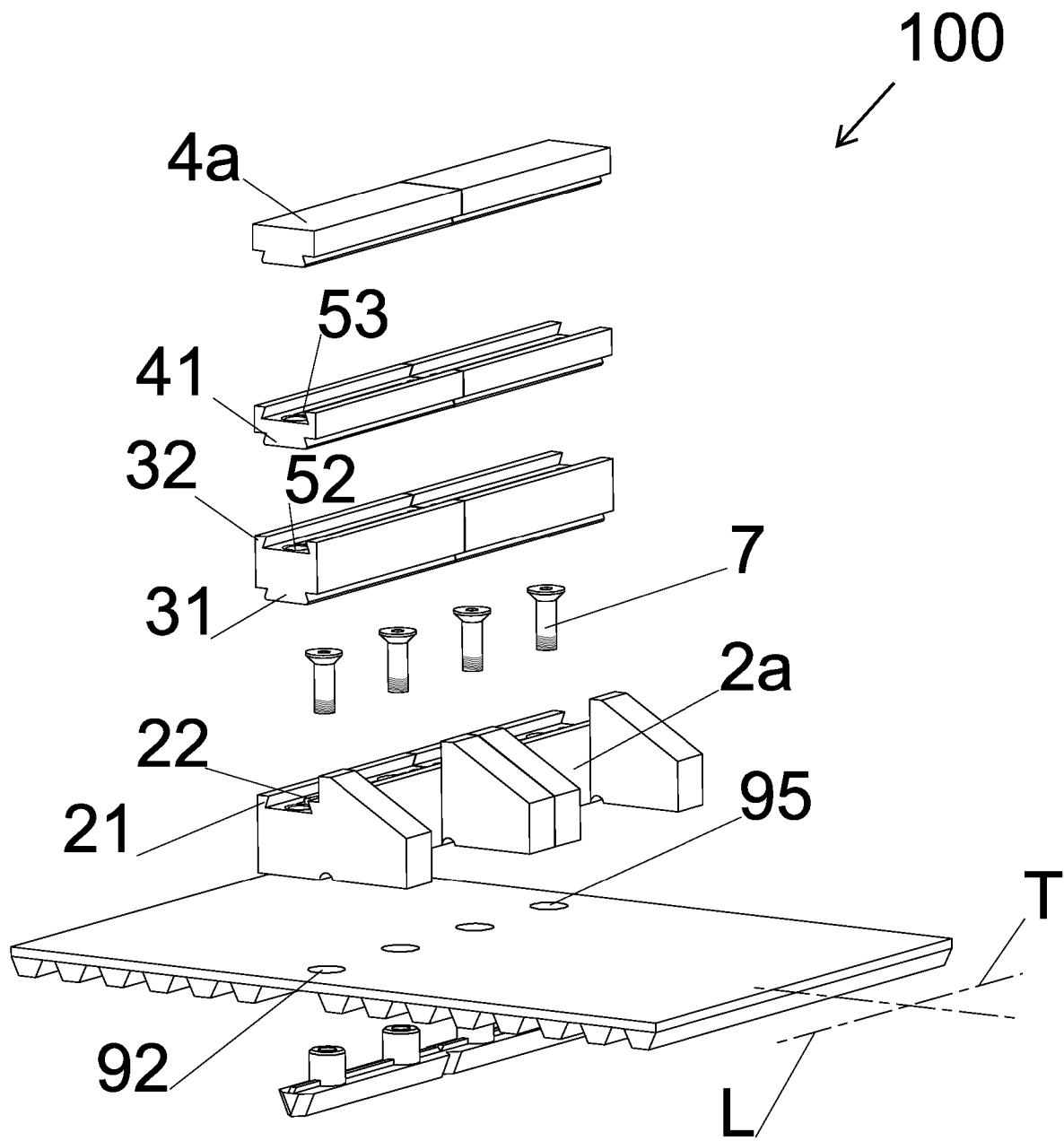
FIG. 8 is an exploded view of FIG. 7.
Figure 9:
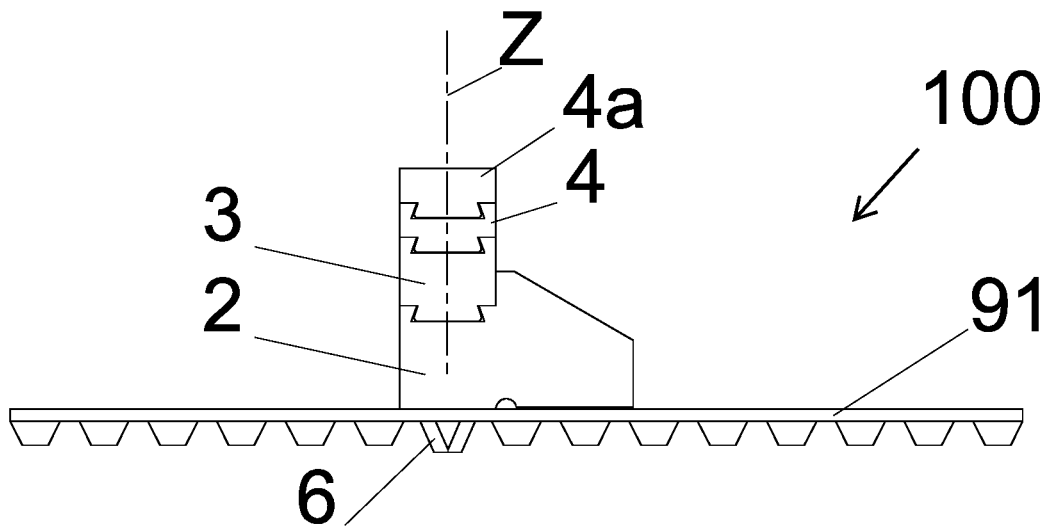
FIG. 9 and FIG. 10 illustrate lateral views respectively of FIG. 7 and FIG. 8.
Figure 10:
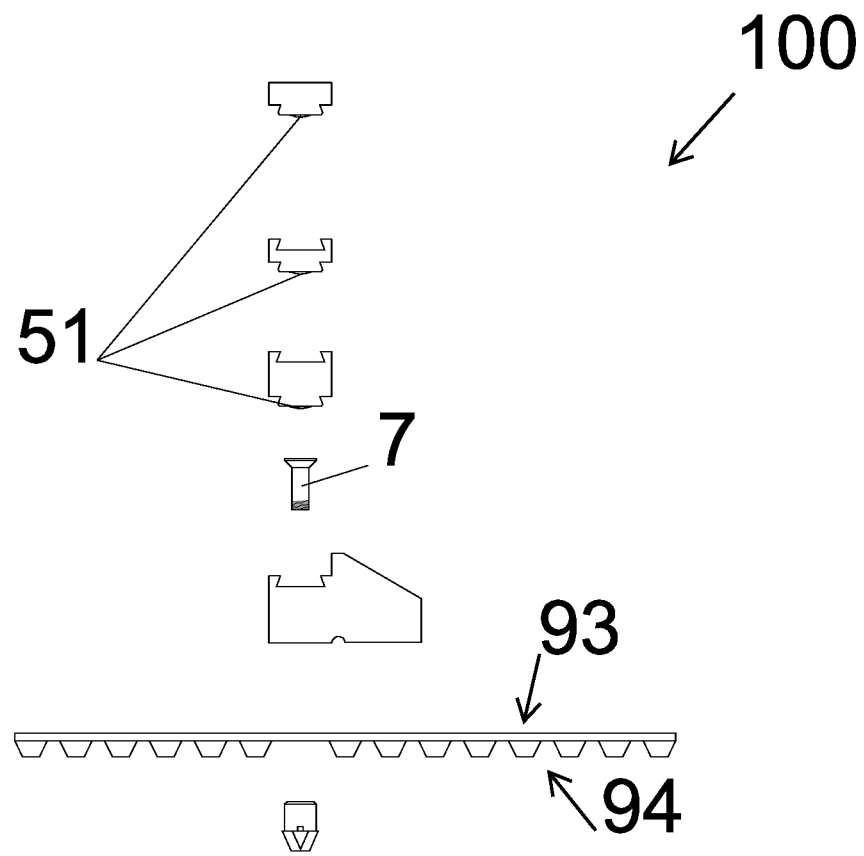

FIG. 8 shows threaded elements (7) which engage only the base piece (2) while in FIG. 13 the threaded elements (7) also engage the pieces arranged above the base piece (2). The coupling parts (21, 31, 32, 41) of the embodiment of FIG. 13 do not prevent the relative displacement of the pieces in the vertical direction (Z) and are therefore blocked in a pack by means of the threaded elements (7). On the contrary, the coupling parts (21, 31, 32, 41) of the embodiment of FIG. 8 offer resistance to relative vertical movement and allow use of a threaded element (7) of the same height regardless of the height of the accessory assembly (1).

Two pieces from among the base piece (2), the first piece (3) and the second piece (4) are preferably configured to couple by sliding with respect to one another and the relative coupling parts (21, 31, 32, 41) respectively comprise a projection (51) and an indentation (52) which are configured in such a way that the indentation (52) accommodates the projection (51) so that subsequently the indentation (52) and the projection (51) pose resistance to further sliding between the two pieces.

Though not strictly necessary, for example in the case of exploiting the flexibility of the material, the presence of walls offering resistance to relative vertical movements leads to sliding coupling among the pieces.

The sliding among the pieces can also be preferable to facilitate the mounting, especially when this takes place directly on the toothed belt (9).

The projections (51) and the indentations (52), for example visible in FIG. 6, guarantee the alignment between the pieces in the vertical direction, for example by preventing projections between the pieces in the direction of the width thereof. More preferably, at least one of the at least two pieces comprises a recess (53) arranged to accommodate the projection (51) so as to facilitate the sliding between the two pieces. For example, with reference to FIG. 2, one of the two projections (51) would offer resistance to the sliding of the piece if a recess (53) were not included between the two indentations (52) of the other piece.

The indentation (52) and/or the recess (53) are preferably conformed so as to define access surfaces, for example with beveling or connections.

Figure 2:
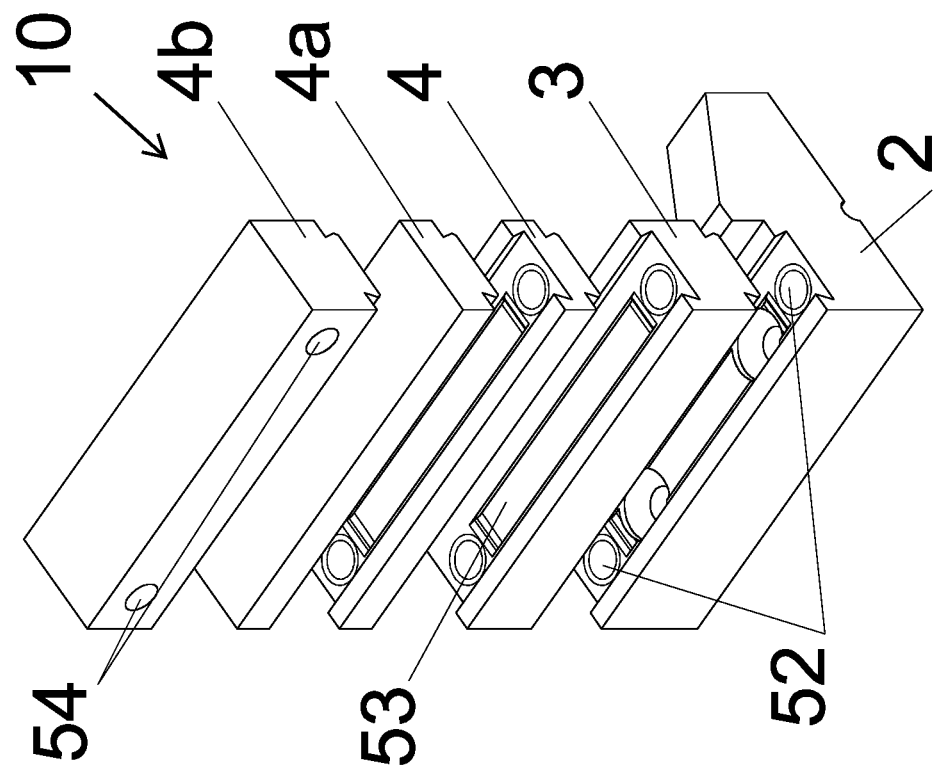
FIG. 2 is an axonometric view of FIG. 1 with the exploded accessory assembly.

The second piece (4) preferably comprises a hole (54) for connecting an abutment part (8) for contacting objects. With reference to FIG. 2, a hole (54) in the second piece (4) as illustrated, or in a further second piece (4a, 4b), facilitates the coupling of other elements, such as for example the abutment part (8) of FIG. 13.

To customise the accessory assembly (1) in width and/or to enable the association of other elements, the accessory assembly (1) preferably comprises a second base piece (2a) identical or similar to the first base piece (2) and/or further identical or similar pieces to the first piece (3) and/or the second piece (4).

The second base piece (2a) is preferably configured for contacting the base (91) of a toothed belt (9), of a toothed conveyor belt (9a) or of a portion thereof and it comprises a respective coupling part (21a) complementary to the second coupling part (31) so that the first piece (3) is couplable above the second base piece (2). Further, the first piece (3) and/or the second piece (4) and/or, possibly, a further second piece (4a, 4b) extends in such a way as to be connected, directly or indirectly, to both the base piece (2) and the second base piece (2a). As can be seen in FIG. 34 on or more pieces can extend in width to cover the whole width of the accessory assembly (1) i.e. the width of the base piece (2) and the second base piece (2a). This improves the stability and the behaviour of the accessory assembly (1) in the transversal direction (T).

Numerous combinations are possible, for example the first piece (3) might extend to couple also with the second base piece (2a) and/or the second piece (4) might couple indirectly with the second base piece (2a).

The base piece (2) preferably comprises a second through-hole (22). Also the first piece (3) and/or the second piece (4) possibly comprise a through-hole which is arranged so as to be at the second through-hole (22) when the pieces are coupled to one another.

The accessory assembly (1) preferably performs the functions of a cleat, a flight, a profile or support.

As mentioned in the foregoing, the accessory assembly (1) is preferably realised starting from a kit (10) which usually comprises numerous pieces which are combined to form the accessory assembly (1) with the desired characteristics.

The kit (10) for forming an accessory assembly (1) having an established height, for toothed belts (9), toothed conveyor belts (9a) or portions thereof comprises a base piece (2), a first piece (3) and a second piece (4) according to the teachings of the present description.

The first piece (3) preferably has a height, from the side of the second coupling part (31) to the opposite side, that is different to the height of the second piece (4), from the side of the fourth coupling part (41) to the opposite side.

A first piece (3) and a second piece (4) having different heights facilitate the customisation of the accessory assembly (1).

In line with the above illustration, the invention also relates to a method for realising an accessory assembly (1) having an established height. The method is preferably actuated with the kit (10).

In a preferred embodiment the method comprises steps of:
  providing a base piece (2), a plurality of first pieces (3) and a plurality of second pieces (4) according to the teachings of the present description, the second pieces (4) of the plurality of second pieces (4) being without a coupling part complementary to the second coupling part (31) on the opposite side to the fourth coupling part (41);
  selecting the pieces, from among the plurality of second pieces (4) and the plurality of first pieces (3), to be located above the base piece (2) so as to obtain the established height when coupled;
  coupling the selected pieces to one another and the base piece (2) so as to form an accessory assembly (1) having an established height.

In the step of selecting the pieces, the piece furthest away from the base piece (2) is advantageously selected from among the plurality of second pieces (4).

In this way, as well as obtaining an accessory assembly (1) of the desired height, the piece positioned furthest away from the base piece (2), i.e. the head of the accessory assembly (1), has no coupling parts facing upwards. This prevents or reduces, for example, interferences with other components or the accumulation of dirt, as well as being aesthetically more pleasant.

For the same reasons, the side opposite the fourth coupling part (41) is more preferably flat.

The invention also relates to a toothed belt (9) or toothed conveyor belt (9a) or to a portion thereof provided with an accessory assembly (1) as well as to a system (100) for moving products.

An embodiment of the system (100) comprises:
  a toothed belt (9), a toothed conveyor belt (9a) or a portion thereof comprising a base (91) with a first through-hole (92);
  an accessory assembly (1) according to the teachings of the present description, the base piece (2), which is arranged on a first side (93) of the base (91) and which comprises a second through-hole (22) at the position of the first through-hole (92);
  a false tooth (6) for toothed belts (9), toothed conveyor belts (9a) or portions thereof comprising an engaged part (61) which engages the first through-hole (92) and is arranged on a second side (94) of the base (91), opposite the first side (93);
  a threaded element (7) which crosses the second through-hole (22) and engages the false tooth (6) so as to secure the accessory assembly (1) to the base (91).

The false tooth (6) cooperates with the threaded element (7) to secure the accessory assembly (1) to the toothed belt (9). These elements give the certainty of blocking and enable regulating the blocking on the basis of the needs of the specific application.

It is specified that in the appended sheets of drawings, and so as not to complicate the illustrations, the threadings of the threaded elements (7) are represented schematically.

The accessory assembly (1) is securely and rapidly associated to the toothed belt (9) and the through-holes and the false teeth can be arranged in accordance with various criteria of customisation based on the modularity of the accessory assembly (1) in height and, possibly, in width.

The base (91) preferably extends in a longitudinal direction (L) and has a further through-hole (95) and the system (100) comprises:
  a further accessory assembly (1) according to the teachings of the present description with the respective base piece (2) being arranged on a first side (93) of the base (91) and comprising a respective second through-hole (22) at the position of the further through-hole (95);
  a further false tooth (6) for toothed belts (9), toothed conveyor belts (9a) or portions thereof comprising an engaged part (61) which engages the further through-hole (95) and is arranged on a second side (94) of the base (91).

In a first version the further accessory assembly (1) and the accessory assembly (1) are arranged in succession and in contact with one another according to a transversal direction (T) to the longitudinal direction (L).

More preferably, the further accessory assembly (1) has a smaller width than the accessory assembly (1), i.e. a smaller extension in the transversal direction (T) so as to facilitate the customisation of the system (100).

In a second version the further accessory assembly (1) and the accessory assembly (1) are arranged in succession but distanced from one another according to the transversal direction (T).

Usually, though not necessarily, the first version is applicable on toothed belts (9) while the second version is applicable on toothed conveyor belts (9a), especially in the presence of holes (54). For example in FIGS. 12 and 13 a toothed conveyor belt (9a) is illustrated, of the double-guided synchronised type to which an accessory assembly (1) and a further accessory assembly (1) are associated in the form of cleats which bear an abutment part (8) for contacting objects. The presence of a false tooth (6) and a distinct further false tooth (6) facilitate the association of the cleats to the belt, synchronized or with antiskid guides or centring guides.

Figure 33:
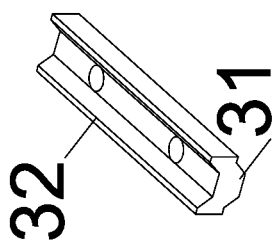

In the case of the first version, the portions of the accessory assembly (1) and of the further accessory assembly (1) which are in contact are preferably conformed to be complementary to one another so as to align along a transversal direction (T) the accessory assembly (1) and the further accessory assembly (1). An example of a conformation that allows this effect is shown in FIG. 33, with the second piece (4) comprising coupling parts laterally and not only inferiorly.

Figure 14:
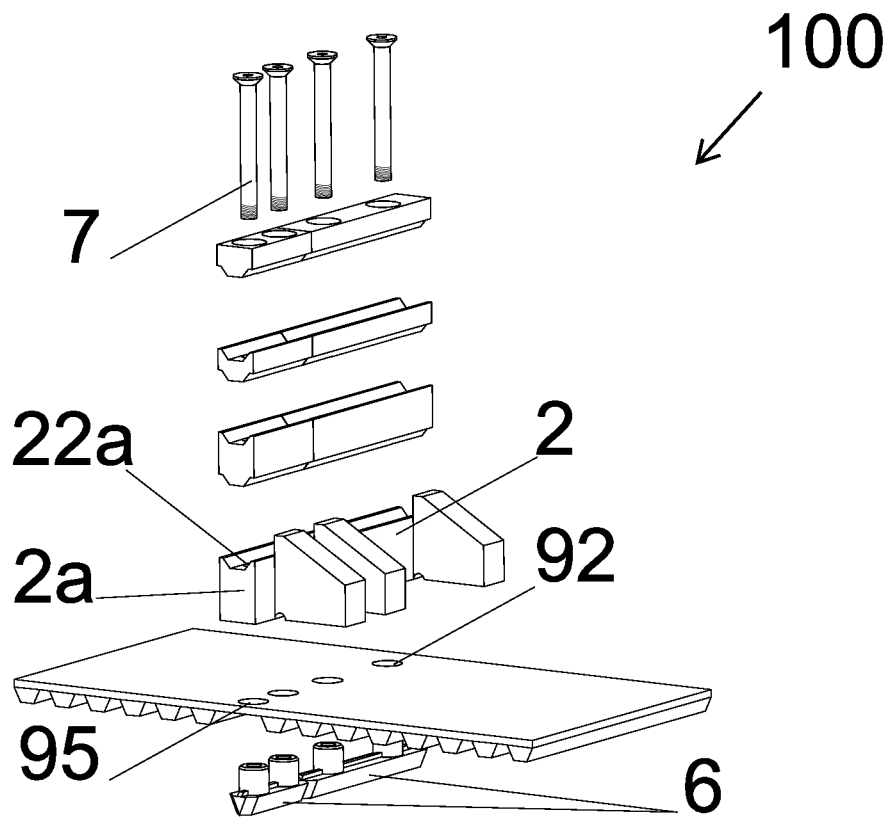
FIG. 14 is an exploded view of another embodiment of a system for moving products according to the invention.

The false tooth (6) and the further false tooth (6) preferably have different widths so as to extend differently in the transversal direction (T), such as is visible is FIG. 14, for example. This enables best ensuring the accessory assembly (1) and the further accessory assembly (1) should they have different widths.

The invention also relates to a piece of accessory assembly (1) for toothed belts (9), toothed conveyor belts (9a) or portions thereof, which comprises a base piece (2) with a first coupling part (21), the piece comprising a second coupling part (31) complementary to the first coupling part (21) so as to be couplable above the base piece (2) in one or more predetermined positions.

The first piece advantageously comprises a third coupling part (32) complementary to the fourth coupling part (31) and which faces in an opposite direction to the second coupling part (31).

The characteristics of this piece of accessory assembly (1) enable performing the customisation thereof in the vertical direction (Z), already illustrated in the foregoing.

The pieces are preferably made of aluminium, preferably subjected to silver ion treatment, or made of additive manufacturing or three-dimensional printing material such as Acrylonitrile butadiene styrene, Polyethylene terephthalate, Acrylonitrile styrene acrylate, polyamide, aluminium powder and/or polyurethane. In the appended sheets of drawings the base pieces (2) and the second base pieces (2a) comprise ribbings with the exception that in FIG. 34 the ribbings enable the accessory assembly (1) to offer a greater resistance; but they are not necessary.

It is understood that the above has been described by way of non-limiting example and that any constructional variants are considered to fall within the protective scope of the present technical solution, as claimed in the following.

The invention claimed is:

1. An accessory assembly for toothed belts, toothed conveyor belts or portions thereof comprising a base, wherein the accessory assembly comprises:
   a base piece, for contacting the base of a toothed belt, of a toothed conveyor belt or of a portion thereof, comprising a first coupling part;
   a first piece comprising a second coupling part;
   wherein:
      the first coupling part and the second coupling part are complementary to one another so that the first piece is couplable above the base piece in one or more predetermined positions;
   wherein the accessory assembly comprises a second piece comprising a fourth coupling part and wherein:
      the fourth coupling part and the first coupling part are complementary to one another so that the second piece is couplable above the base piece in one or more predetermined positions;
      the first piece comprises a third coupling part complementary to the fourth coupling part and which faces in an opposite direction to the second coupling part and the second piece is couplable above the first piece in one or more predetermined positions; and
      the first coupling part is coupled to the second coupling part so that the first piece is coupled above the base piece and the fourth coupling part is coupled to the third coupling part so that the second piece is coupled above the first piece.

2. The accessory assembly of claim 1, wherein the third coupling part is conformed alike to the first coupling part.

3. The accessory assembly of claim 1, wherein the base piece, the first piece and the second piece are conformed in such a way as to define a flat vertical wall.

4. The accessory assembly of claim 1 wherein at least two parts, couplable to one another, between the first coupling part, the second coupling part the third coupling part and the fourth coupling part, are configured so as to pose resistance to a relative vertical movement between the base piece and the first piece or between the first piece and the second piece, when coupled.

5. The accessory assembly of claim 4, wherein at least two pieces from among the base piece, the first piece and the second piece are configured to couple by sliding with respect to one another and wherein the relative coupling parts respectively comprise a projection and an indentation which are configured in such a way that the indentation accommodates the projection so that subsequently the indentation and the projection pose resistance to further sliding between the two pieces.

6. The accessory assembly of claim 5, wherein at least one of the at least two pieces comprises a recess arranged to accommodate the projection so as to facilitate the sliding between the two pieces.

7. The accessory assembly of claim 1 wherein the second piece comprises a hole for connecting an abutment part for contacting objects.

8. The accessory assembly of claim 1 comprising:
   a second base piece for contacting the base of a toothed belt, of a toothed conveyor belt or of a portion thereof, comprising a respective coupling part complementary to the second coupling part so that the first piece is couplable above the second base piece;
   wherein the first piece and/or the second piece extends in such a way as to be connected, possibly indirectly, to both the base piece and the second base piece.

9. The accessory assembly of claim 1 configured for use as a cleat, a flight, a profile or support.

10. The accessory assembly of claim 1 wherein the first piece has a height, from the side of the second coupling part to the opposite side, that differs from the height of the second piece, from the side of the fourth coupling part to the opposite side.

11. A method for realising an accessory assembly, having an established height, for toothed belts, toothed conveyor belts or portions thereof comprising a base, the method comprising steps of:
   providing
      a base piece, for contacting the base of a toothed belt, of a toothed conveyor belt or of a portion thereof, comprising a first coupling part,
      a plurality of first pieces, each comprising a second coupling part and
      a plurality of second pieces, each comprising a fourth coupling part and being without a coupling part on a side opposite to the fourth coupling part;
   selecting the pieces, from among the plurality of the second piece and the plurality of the first piece, to be located above the base piece so as to obtain the established height when coupled;
   coupling the selected pieces to one another and the base piece so as to form an accessory assembly having an established height;
   wherein the first coupling part and the second coupling part are complementary to one another so that the first piece is couplable above the base piece in one or more predetermined positions;
   wherein the fourth coupling part and the first coupling part are complementary to one another so that the second piece is couplable above the base piece in one or more predetermined positions;
   wherein the first piece comprises a third coupling part complementary to the fourth coupling part and which faces in an opposite direction to the second coupling part and the second piece is couplable above the first piece in one or more predetermined positions;
   wherein in the step of selecting the pieces, the piece furthest away from the base piece is selected from among the plurality of second pieces.

12. A system for moving products, comprising:
a toothed belt, a toothed conveyor belt or a portion thereof comprising a base with a first through-hole;
the accessory assembly of claim 1, the base piece being arranged on a first side of the base and comprising a second through-hole at the position of the first through-hole;
a false tooth for toothed belts, toothed conveyor belts or portions thereof comprising an engaged part which engages the first through-hole and is arranged on a second side of the base, opposite the first side;
a threaded element which crosses the second through-hole and engages the false tooth so as to secure the accessory assembly to the base.

13. The system of claim 12, wherein the accessory assembly comprises a first accessory assembly, the base extending in a longitudinal direction and having a further through-hole and wherein the system comprises:

a further accessory assembly identical to the first accessory assembly, with a respective base piece being arranged on a first side of the base and comprising a respective second through-hole at the position of the further through-hole;
a further false tooth for toothed belts, toothed conveyor belts or portions thereof comprising an engaged part which engages the further through-hole and is arranged on a second side of the base;
wherein the further accessory assembly and the first accessory assembly are arranged in succession and in contact to one another according to a transversal direction to the longitudinal direction.

14. The system of claim 13, wherein the portions of the first accessory assembly and of the further accessory assembly which are in contact are conformed to be complementary to one another so as to align along a transversal direction the first accessory assembly and the further accessory assembly.

* * * * *